United States Patent [19]
Jardine et al.

[11] Patent Number: 5,687,308
[45] Date of Patent: Nov. 11, 1997

[54] METHOD TO IMPROVE TOLERANCE OF NON-HOMOGENEOUS POWER OUTAGES

[75] Inventors: Robert L. Jardine, Cupertino; Richard M. Collins, Campbell; A. Richard Zacher, Los Gatos, all of Calif.

[73] Assignee: Tandem Computers Incorporated, Cupertino, Calif.

[21] Appl. No.: 487,941

[22] Filed: Jun. 7, 1995

[51] Int. Cl.⁶ .................................................. G06F 11/00
[52] U.S. Cl. ...................... 395/182.02; 395/182.2; 395/182.09
[58] Field of Search .................. 395/182.21, 182.22, 395/182.12, 182.2, 182.09, 182.1, 182.11, 200.1, 200.11, 182.02

[56] References Cited

U.S. PATENT DOCUMENTS

| | | | |
|---|---|---|---|
| 4,228,496 | 10/1980 | Katzman et al. | 395/200 |
| 4,321,666 | 3/1982 | Tasar et al. | 395/575 |
| 4,323,966 | 4/1982 | Whiteside et al. | 395/575 |
| 4,356,546 | 10/1982 | Whiteside et al. | 395/182.08 |
| 4,590,554 | 5/1986 | Glazer et al. | 395/200 |
| 4,634,110 | 1/1987 | Julich et al. | 395/182.09 |
| 4,757,442 | 7/1988 | Sakata | 395/182.1 |
| 4,817,091 | 3/1989 | Katzman et al. | 395/182.08 |
| 4,868,818 | 9/1989 | Madan et al. | 395/182.02 |
| 4,939,752 | 7/1990 | Literati et al. | 395/182.02 |
| 4,951,069 | 8/1990 | Rabjohns et al. | 395/182.21 |
| 4,991,174 | 2/1991 | Mori et al. | 371/15.1 |
| 5,016,243 | 5/1991 | Fite, Jr. | 395/182.02 |
| 5,301,309 | 4/1994 | Sugano | 395/182.1 |
| 5,301,311 | 4/1994 | Fushimi et al. | 395/182.21 |
| 5,317,752 | 5/1994 | Jewett et al. | 395/750 |
| 5,367,697 | 11/1994 | Barlow et al. | 395/183.11 |
| 5,452,441 | 9/1995 | Espsito et al. | 395/182.11 |

OTHER PUBLICATIONS

Cristian et al., "Automatic Service Availability Management in Asynchronous Distributed Systems", Configurable Distributed Systems, Int'l Workshop, IEEE, pp. 58–68, 1994.

Cristian, "Automatic Service Availability Management", Autonomous Decentralized Systems, Int'l Symposium, IEEE pp. 360–366, 1993.

*Primary Examiner*—Robert W. Beausoliel, Jr.
*Assistant Examiner*—Joseph E. Palys
*Attorney, Agent, or Firm*—Townsend and Townsend and Crew; Larry Mendenhall

[57] ABSTRACT

Multiple processors are connected to form a multiprocessor system having inter-processor communicating capability. Each processor maintains a configuration option register indicating the resources necessary to operate the multiprocessor system. In the event of a power-fail signal, indicating that possible power loss is imminent, a processor will proceed through a shut-down procedure to save the present operating state so that when power is re-applied the processor can continue from the operating state it left when power was lost. Those processors not receiving a power-fail signal will attempt to reconfigure the multiprocessor system, waiting a reasonable amount of time for the processor receiving the power-fail signal to continue operations. If the processor has not recovered from the power-fail signal after a reasonable amount of time, the other processors check the configuration option register to determine whether that processor is necessary for operation of the multiprocessor system. If it is, then the processors wait for the processor according to a formula specified in said reconfiguration option register. Otherwise, the processors exclude the processor from the system and continue operation without the excluded processors.

18 Claims, 4 Drawing Sheets

METHOD TO IMPROVE TOLERANCE OF NON-HOMOGENEOUS POWER OUTAGES

BACKGROUND OF THE INVENTION

This invention relates generally to fault-tolerant multiprocessor systems. In particular, this invention relates to methods for improving the resilience of a multiprocessor system where a critical amount of a resource is necessary for the multiprocessor system to operate correctly.

Fault-tolerant computing, evolving as it did from early specialized military and communications systems, is found today in a variety of commercial system designs. Fault tolerant designs seek to provide the advantages of increased system availability and continuous processing together, if possible, with the ability to maintain the integrity of the data being processed. Designs for achieving fault tolerance range from providing sufficient redundancy to reconfigure around failed components to using "hot backups" that sit inactive and wait for a failure of a primary unit before being called into action. Also included in many fault tolerant designs are methods of protecting data in the face of the inevitable: a fault that may bring down the system.

One fault-tolerant design approach, an example of which can be found in U.S. Pat. No. 4,817,091, is a fault-tolerant multiple processor system in which the individual processors, in addition to performing individual and independent tasks, are provided the ability to communicate with one another. Using this communication ability, each processor will periodically broadcast its well-being by sending a message (called an "I'm Alive" message) to all the other processors in the system. The absence of an I'm Alive message from any processor is an indication that the silent processor might have failed and may be unable to recover. When the absence of an expected I'm Alive message is noted by the other processors in the system, they will initiate a "regroup" operation to determine what processors are still present and operating in the system and to confirm that the silent processor is no longer available. The regroup operation involves each processor broadcasting multiple messages telling its companion processors its view of the system (i.e., what processors it sees as still operating). If a processor has failed and does not participate in the regroup operation, it will be ostracized from further communication in the system so that even if the failed processor at some subsequent time begins to send messages they will be ignored. (Actually, an implementation of this prior art technique does send a reply in the form of a "poison packet" which, in effect, informs the ostracized processor that it has been excluded from the system and that it should shut itself down.) The performance of those functions previously performed by the failed processor is shifted to another processor.

Other features of such fault-tolerant systems include the prevention of loss of data and quick and more complete recovery from unavoidable shut-downs of operation from, for example, loss of operating power, ranging from total loss to momentary loss. Some fault-tolerant systems provide a backup power in the form of batteries in the event primary power is lost to allow the system to maintain memory-stored data. Accordingly, if advance warning is provided of impending power loss, a processor may have time to store its operating state and data before the loss of primary power puts the processor in "hibernation."

During the period a processor is preparing for hibernation, and thereafter restoring its pre-hibernation state, it is not bothering to send or is not capable of sending the periodic I'm Alive messages. The time taken is greater than that between the expected I'm Alive transmissions. This creates the possibility of a problem: if a momentary power drop occurs that causes only one or a few of the system's processors to receive a warning and to go into hibernation, they will cease their I'm Alive broadcasts, causing those processors that did not experience a power warning to regroup and ostracize those that did. Thus, even though all processors of the multiple processing system may be in proper working order, a momentary drop in primary power sensed by fewer than all the processors of the system can cause a decrease in overall operating efficiency of the system.

Even should the system succeed in including in a regroup those processors only momentarily unavailable, there are still situations where specific processors or other specific resources are required for continued operation of the system, yet the resilience of the fault-tolerant system allows the system to restart anyway. For example, in a redundant computing environment where the accuracy of operation is determined by a majority of processors, a quorum of three, five or more processors may be necessary for restarting operations from a pre-power outage event state. Alternatively, a minimum number of processors may be required to insure the availability of sufficient raw compute power to handle anticipated situations or even minimum loads. In these scenarios, the above-described power failure recovery methods fail to qualify continued operation of the multiprocessor system on the presence of some minimum required resources, instead restarting operation when nominally one processor restarts within a predetermined amount of time.

Accordingly, there is a need for a fault-tolerant multiprocessor system wherein minimum resources of the system must be simultaneously available after a power event before any of the processors of the system can resume. Additionally, there is a need for a such a fault-tolerant system that provides more time for temporarily mute processors to make themselves known and be included in regroup operations, increasing the probability that the required minimum resources will survive the regroup operation.

These and other goals of this invention will be readily apparent to one of skill in the art on reading this disclosure.

SUMMARY OF THE INVENTION

The present invention is directed to use by those types of fault-tolerant multiple processor systems described above, i.e., those in which processors periodically communicate their status to one another, have the ability to initiate a shut-down procedure when a power-fail warning is received, saving information that is used to quickly resume operation when able and an ability to exclude processors which do not resume operation after a reasonable time. The present invention provides a simple, effective manner for permitting the system administrator to specify when the system should exclude processors and continue operation and when the system should wait longer and not continue operation because of the missing processors.

Broadly, the invention includes having each processor maintain a configuration option register indicating the configuration of resources that the multiprocessor system needs for correct operation. After a power-fail shut-down of a processor and after a regroup operation is initiated to determine the complement of processors present in the system, the regrouping operation may be suspended if the configuration option register indicates that there are not enough resources available for the system to operate correctly. The processors performing the regrouping operation will go into hibernation, as will any other processors that complete their recovery from the power-fail warning, until the resources of the processors in hibernation meet the resource configuration deemed necessary by the configuration option register.

DESCRIPTION OF THE PREFERRED EMBODIMENT

Figure 1:
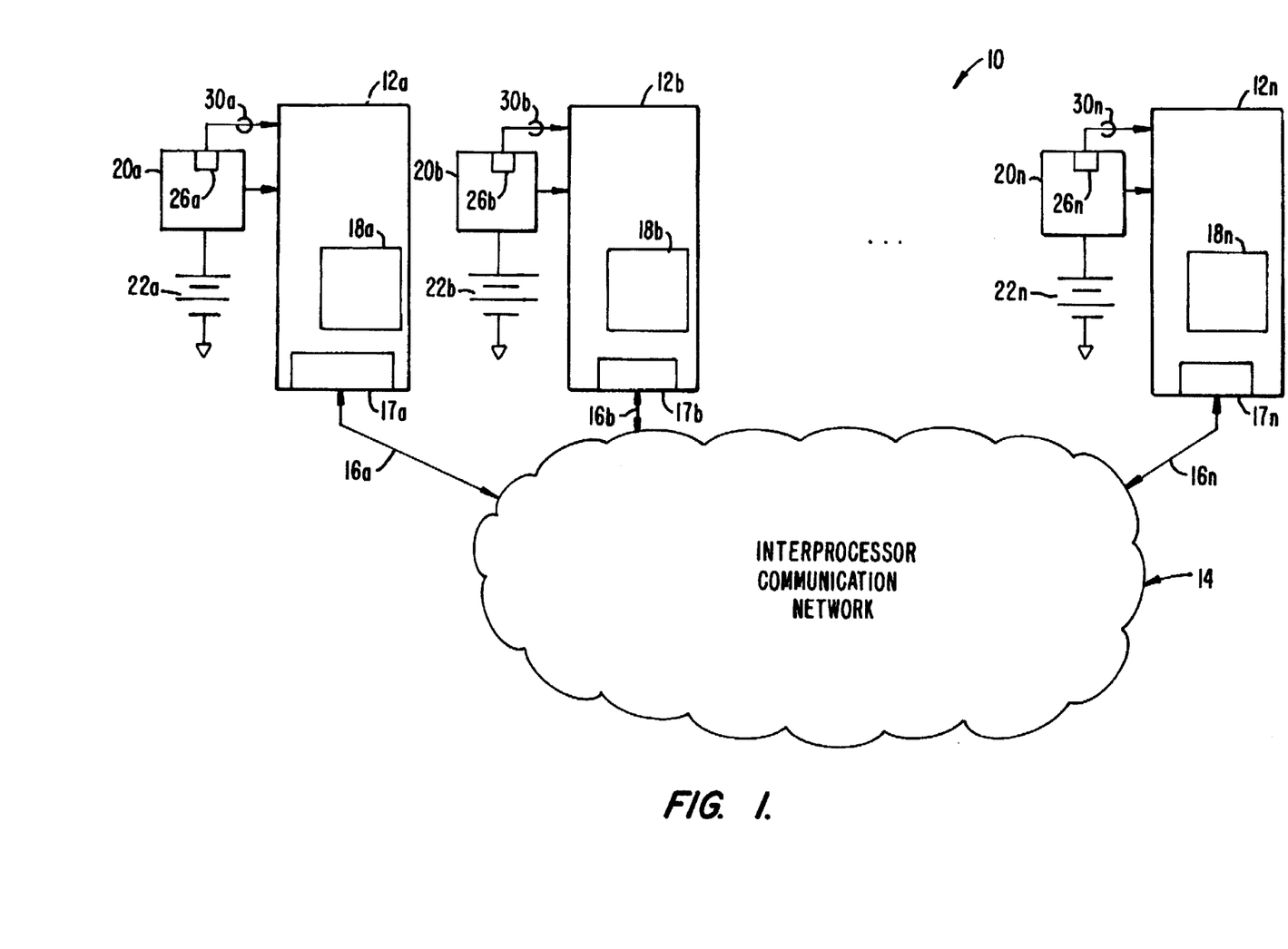
FIG. 1 is a simplified block diagram of a multiple processing system in which the processor units of the system are communicatively intercoupled for incorporating use of the present invention.

Turning now to FIG. 1, there is illustrated a multiple processing system 10, designated generally with the reference numeral 10, comprising processors 12a, 12b, . . . , 12n. The actual number of processors 12 could be anything more than one for effective use of the present invention, although the multiple processor systems for which the present invention has been designed typically are limited to no more than sixteen processors. It will be evident to those skilled in this art, however, that the present invention does not limit the actual number of processors that can be used.

The multiple processing system 10 may be constructed, using the teachings of the aforementioned U.S. Pat. No. 4,817,091, and therefore, to the extent necessary, U.S. Pat. No. 4,817,091 is incorporated herein by reference.

The processors 12 are interconnected by a network 14 and bus connections 16 that provide the processors 12 with interprocessor communication via transceivers 17. The network 14 may be implemented by a bus system that interconnects processors 12, in parallel, and is independent from any input/output (I/O) system that the processors may have, such as is taught by the aforementioned U.S. Pat. No. 4,817,091. Alternatively, the network 14 could be implemented as part of a joint I/O system that provides the processors 12 not only with access to various I/O units (e.g., printers, secondary storage, and the like—not shown), but also provide communication paths for interprocessor communication for the processors 12. The network 14 can also be any point-to-point network such as rings, fully-connected stars and trees.

Internal to or otherwise associated with each of the processors 12 is a memory 18 that is independent from the memory 18 of the other processors 12 and a time-of-day clock (not shown) independent of the time-of-day clocks of the other processors 12. Also associated with each of the processors 12 is a power supply 20 that receives primary power (e.g., alternating current; not shown) to supply therefrom the necessary electrical power (e.g., direct current) for operation of the associated processor 12. Each of the power supplies 20 includes a backup source of power in the form of a battery 22. The batteries 22 supply the necessary power to allow the memories 18 of the processors 12 to retain their content and the time-of-day clocks to maintain the time in the event the primary power is lost or otherwise disrupted.

Included in each of the power supplies 20, or otherwise associated therewith, are supervisor circuits 26 of generally conventional design that function to maintain a vigil over the operation of the power supplies 20. In particular, insofar as is pertinent here, the supervisor circuits 26 can detect drops in voltage to develop a power-fail warning signal that is communicated, via signal line 30, to the associated processor 12. When the warning of an impending power drop or outage is asserted, the processors 12 usually will have a guaranteed period of time before all operation must cease for lack of power. The processors 12, therefore, will be able to use that time, as will be discussed in greater detail below, to prepare for the impending hibernation being forced upon them.

The network 14 forms the medium that allows the processors 12 to send and receive messages to and from one another to communicate data, status, and other information therebetween. In addition, each of the processors 12 uses the network 14 for broadcasting messages, at periodic intervals, that indicate the continued operation of the broadcasting processor, called "I'm Alive" messages. Approximately every 1.2 seconds each of the processors 12 will broadcast to all other of the processors 12 an I'm Alive message, containing among other information an identification of the broadcasting processor. Approximately every 2.4 seconds each processor 12 will check to see what I'm Alive messages it has received from its companion processors, and a failure to receive an I'm Alive message from a processor (e.g., processor 12b) known to previously be a part of the system 10 will raise the assumption that the processor 12b has, for whatever reason, ceased operation. The failure to receive an I'm Alive message from a processor known to have been part of the system will prompt the other processors to initiate a "Regroup" operation in which the other processors begin broadcasting a Regroup message, identifying the sending processor 12, and containing that processor's view of the system, including an identification of those processors it believes form the system. A successful Regroup operation, initiated by failure to receive an expected I'm Alive message from, for example, processor 12b, will result in the remaining processors ignoring any further message traffic from the processor 12b, should it send any. In effect, the failure to receive an I'm Alive message within the allotted time will cause the other processors to ostracize the mute processor(s) from the system.

A Regroup operation, which is also initiated automatically when the system 10 recovers from a loss of power, proceeds through multiple stages, only the first of which is relevant here. The first stage of the Regroup operation, and its modification to accommodate the present invention, is described more fully below in connection with FIG. 5.

Before continuing with the description of a regroup operation, other features of the system 10 will be explained in order to provide an understanding of the interaction of those features, and the Regroup operation, with the present invention. One such other feature is the ability, through the aegis of the supervisor circuits 26, of providing early warning of an impending loss of power; the other feature is the action taken in response to that warning. As indicated above, the supervisor circuit 26 is associated with the power supply 20 of each processor 12 to provide advance warning of a loss of primary power in the form of a power-fail warning signal.

Figure 2:
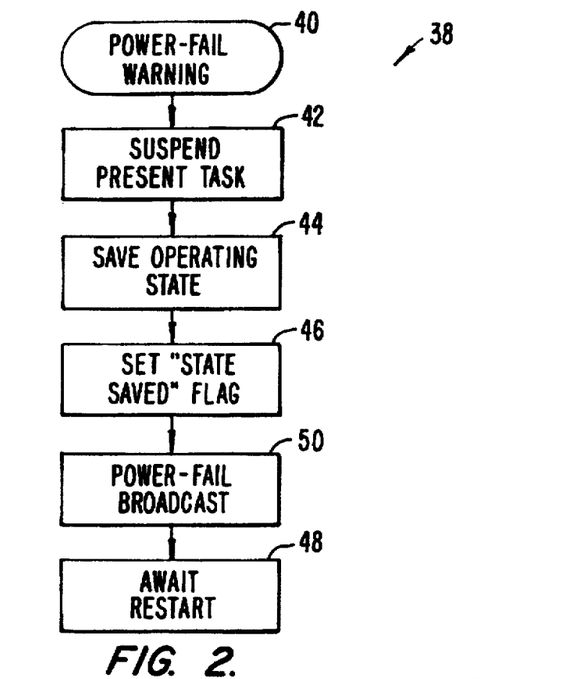
FIG. 2 is a flow diagram illustration of the steps taken in response to a power-fail signal according to the invention of U.S. patent application Ser. No. 08/265,585.
Figure 3:
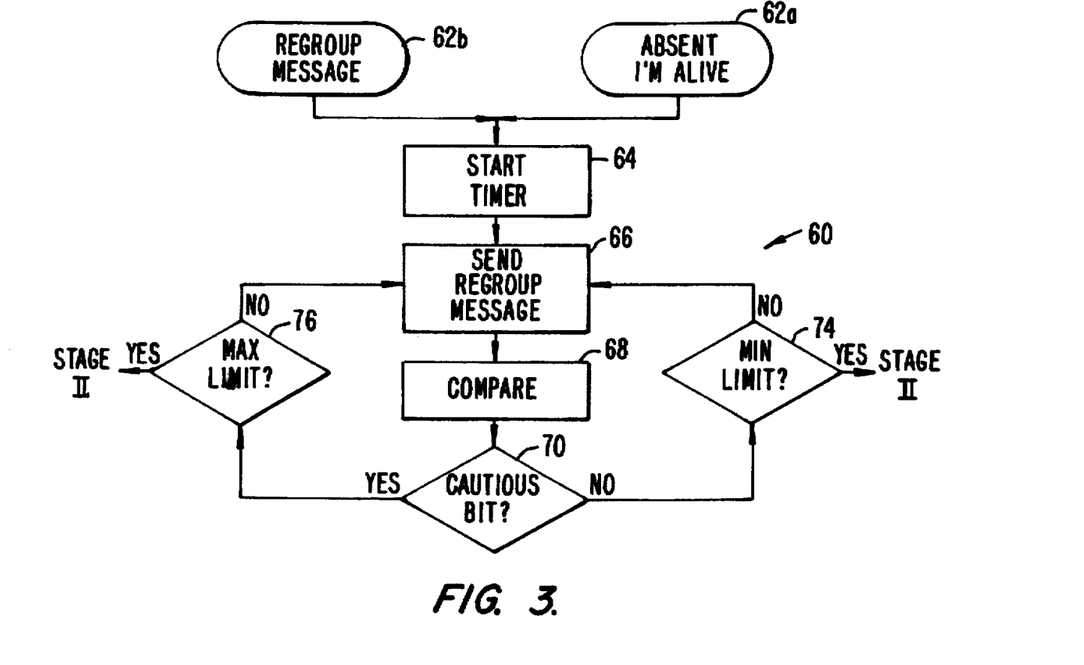
FIG. 3 is a flow diagram that broadly illustrates the regroup operation taken by the processors of FIG. 1 to determine which processors are present in the system.

Upon receipt of the power-fail warning signal, a processor 12 has a period of time during which it is guaranteed good power before it must cease operation. (This period of time can vary depending upon the tasks that must be performed before hibernation. For example, some systems manufactured by the assignee of this invention have a guarantee that power will remain nominal for approximately 5 milliseconds. Other systems, notably those with more cache whose content must be stored to the memory 18, require more time.) During that time period, the processor 12 will initiate the pre-hibernation routine illustrated in FIG. 2. The methods of FIGS. 2 and 3 are presented in U.S. patent application Ser. No. 08/265,585. As FIG. 2 illustrates, receipt at step 40 of the power-fail warning signal will move the processor 12 to step 42 where the processor will gracefully suspend any task it may then be performing. The processor 12 will then, at step 44, undertake to save its present operating state to memory 18 so that, if and when primary power is later restored, the processor may re-start the task it was performing with a minimum of effort, and without loss of data, assuming the saved state and data are still available when primary power is restored. The processor 12 then proceeds to step 46 to write a flag (not shown) in memory that indicates the state was successfully saved. Before going into hibernation (step 48) to await a re-awakening, the processor will perform the step, time permitting, of broadcasting to all other processors 12 that the broadcasting processor has received a power-fail warning signal and, as a result, is in a pre-hibernation sequence. (As discussed further below, those processors receiving the power-fail broadcast will record that receipt so that when the next regroup operation occurs, the possibility of a momentarily unresponsive processor, as a result of a power-fail routine, can be taken into account.) The processor then puts itself into a hibernation (idle) state to await the loss of power and subsequent re-start when power is restored, or if power is not lost (e.g., the warning resulted from a momentary power drop), just the re-start (i.e., re-initialization). This entire process, from receipt and recognition of the power-fail warning signal to writing the flag indicating that the processor state was successfully saved normally takes approximately one-half the amount of guaranteed time of good power, or less. This is more than enough time before the actual loss of power is felt.

Later, when primary power is restored, the processor need not re-create prior operating data; rather, the processor can quickly resume operation by merely restoring the operating state and data saved prior to hibernation. Thus, during the restart and re-initialization operation to bring the processor 12a back on-line, the processor 12a will check the "state saved" flag to determine if, in fact, during the pre-hibernation sequence the processor's operating state was successfully saved. If not, of course, the processor must go through a much longer initialization period in order to restore the processor to that point of operation it was at before or at the assertion of the power-fail warning signal that put it into hibernation. However, if the flag is set to indicate that the operating state was successfully saved during the pre-hibernation sequence, the processor 12a can quickly restore the pre-hibernation operating state from the memory 18a.

During the pre-hibernation sequence of processor 12a and subsequent restart and initialization, the processor 12 will not be sending the periodic I'm Alive messages. Such momentary power drops or fluctuations may not be noticed by all processors 12, but by only some of them. For example, assume that a power fluctuation causes the supervisor circuit 26a to assert the power-fail warning signal, but the supervisor circuits 26 (26b, . . . , 26n) of the remaining processors 12 (12b, . . . , 12n) did not detect the fluctuation and, therefore, did not assert a power-fail warning signal. (Reasons for this include the fact that the power supplies 20 may not all have the same internal capacitance. Thus, those with a larger capacitance can mask small fluctuations, whereas others with smaller internal capacitance may not. Further, the power supplies 20 may be presented with different loads by the associated processors such as would be the case involving processors with different amounts of memory. Also, the supervisor circuit 26 could be faulty, signalling false indications of power drops.) The asserted power-fail warning signal from the supervisor circuit 26a will cause the processor 12a to go through its pre-hibernation sequence of FIG. 2, during which time the processor 12a will not send I'm Alive messages. Accordingly, the other processors 12b, . . . , 12n of the system 10 that look for the I'm Alive signals every 2.4 seconds, will note the absence of an I'm Alive transmission from the processor 12a. This will cause the remaining processors (12b, . . . , 12n) to initiate a Regroup operation that most likely will be completed before the processor 12a will come out of its self-imposed hibernation. The Regroup operation (which is described in more detail below) will conclude without the participation of the processor 12a, resulting in the processors setting their respective data structures in a manner that ostracizes processor 12a. Thereafter, insofar as the processors 12b, . . . , 12n are concerned, the processor 12a is no longer part of the system 10, and any messages from that processor will be ignored by the others. The function of the processor 12a will be taken over by one or more of the other processors.

The regroup operation is performed in a number of stages, but only the first stage, Stage I, is important here to the understanding to the present invention. The other stages differ from stage I in that the other stages are not based primarily upon the passage of time, as is Stage I (as will be seen).

Turning now to FIG. 3, a flow diagram illustrates Stage I of the Regroup operation, indicated generally with the reference numeral 60. Stage I of the Regroup operation is executed by each of the processors 12. In fact, since the processors 12 do not have their operations synchronized, certain processors will make the check for I'm Alive messages earlier than others, and will enter the Regroup operation before the others.

Stage I of the Regroup operation may also be entered by a processor 12, even though it may not yet have made a check for absence of an I'm Alive message if it receives first a Regroup message (from a processor 12 that has detected absence of an I'm Alive message). Thus, Stage I will begin (steps 62a or 62b) when a processor 12 notes either (step 62a) that a companion processor has failed to transmit its periodic I'm Alive message, or (step 62b) the processor 12 receives a Regroup message from another of the processors 12. Either of theses occurrences, when noted by a processor 12, will cause it to commence Stage I of the Regroup operation. Next, at step 64, the processors 12 participating in the Regroup operation will each start an internal timer (not shown) that will determine the time for Stage I operation. At step 66 each of the processors 12 will send a Regroup message, containing the processor's view of the system 10, including the identification of those processors 12 it believes form the system, its own identity, and a "cautious bit." The processor 12 will set the cautious bit if the processor 12 received any power-fail broadcast prior to entering the Regroup operation 60, or prior to step 66. This Regroup message will prompt all other processors 12, if they have not already (by also noting the failure of a processor 12 to send an I'm Alive message), to also enter the Regroup operation. If any of the other processors 12, upon entering the Regroup operation at step 62, notes that a broadcast of a power-fail message was received since the last Regroup operation, the Regroup message of that processor will have its cautious bit set.

At step 68, the regroup message(s) received by each processor 12 will be examined, and the view of the system contained in the message compared to that view which the processor 12 maintains in the memory 18. If there are differences, the system view maintained in the memory 18 will be updated accordingly. In a preferred embodiment, a regroup message contains a bit mask of the processors known to the processor 12 that constructed the regroup message. This bit mask is OR-ed with a bit mask which a processor 12 receiving the regroup message maintains in its memory 18. Thus, any processor 12 marked in any regroup message as present is marked in the memory-resident bit mask as present.

At step 70, the received Regroup messages are checked to see if any have their cautious bit set. If not, the operation proceeds to step 74, where a minimum time value is compared to the internal timer (not shown) of the processor 12. If the value exhibited by the internal timer equals or exceeds the minimum time value, Stage I of the Regroup operation 60 will be exited in favor of the next stage of the Regroup operation, Stage II. If the value exhibited by the internal timer is less than the minimum time value, then the operation returns to step 66. If, on the other hand, the cautious bit of one of the received Regroup messages is set, step 76 is entered after step 70 and a maximum limit value is compared to the value of the processor's internal timer. If the value of the internal timer exceeds that of the maximum limit value, Stage I of the Regroup operation is left for Stage II. If the value of the internal timer is less than the maximum time value, then the operation returns to step 66.

Note that if a processor 12 receives a momentary or erroneous power-fail warning at any time before, or during, execution of Stage I of the Regroup operation, and it is able to broadcast that fact, Stage I will use the cautious mode and the processor will ultimately be included in the operation. Thus, inadvertent ostracization due to momentary power drops, or erroneous operation of the supervisor circuit 26 will be prevented.

The minimum limit value will keep the processor 12 in Stage I approximately 2 seconds, during which time the processor will continue to send Regroup messages, compare what it receives with its data structure, and make changes as necessary. If the cautious bit is set, the period is approximately ten seconds, more than enough time for any processor who might have been put into hibernation by a detected power fluctuation to be re-started and to participate in the Regroup operation of Stage I (and subsequent Regroup stages).

There is an alternate approach to implementing Stage I. Referring again to FIG. 1, according to this alternate approach each processor 12 will maintain an indication of the state of the cautious bit. (There are other reasons, not relevant here, for setting the cautious bit in order to extend the time that Stage I operates.) All steps shown in FIG. 3 remain, except that at step 70 the cautious bit that is checked by each processor 12 is the one that processor maintains; the cautious bit of received Regroup messages is not taken into consideration. Thus, some of the processors 12 participating in Stage I of the Regroup operation may have their internal cautious bits set to one state (dictating a loop that excludes step 76, but includes step 74) while others have their cautious bits set to the other state (dictating a loop that includes step 76). Therefore, given this situation, some of the processors 12 will leave Stage I in favor of Stage II of the Regroup operation while others remain in Stage I.

Those processors that leave Stage I and enter Stage II will have an internal list of the processors that participated in Stage I, including any processors that also go to Stage II, and those that remain in Stage I. Stage II of the Regroup operation is normally exited when the processors 12 participating in Stage II agree as to the view of the system 10. However, there is a time limit on how long the processors 12 can remain in Stage II. If that limit is exceeded, the participating processors will abort the Regroup operation in favor of initiating a new Regroup event.

When Stage II of the Regroup operation is aborted, and the new Regroup operation initiated with Stage I, the processors 12 will increment a sequence number. This sequence number is also contained in any Regroup messages that are sent during the Regroup operation. In addition, when the Regroup is aborted the processors will set their internal cautious bits to a state that will cause them to use the cautious mode of Stage I; i.e., to execute the loop of Stage I that includes step 76 (but excludes step 74).

When those processors 12 that have exited Stage II of the Regroup operation re-enter Stage I, the processors 12 that were left in Stage I (because they were in the cautious mode) will still be in Stage I. Thus, the re-entering processors 12, after again starting their respective timers (not shown), will proceed to step 66 and send a Regroup message that have a sequence number as incremented. The sequence numbers maintained by the processors 12 should be identical. When a processor 12, at step 68, compares received Regroup messages with its own view of the system 10, it will also compare the sequence number contained in the received Regroup message with that it maintains. Those processors 12 that note a sequence number different from that they maintain, will abort the Regroup operation, exit Stage I, and immediately re-enter Stage I. Now, all processors are again executing Stage I of the Regroup operation, in the manner hereinbefore explained, and all will be in the loop that includes step 76; i.e., all execute the cautious mode of Stage I.

There remains, however, a class of situations where the above methods allow the multiple processing system 10 to restart after some subset of the processors 12 have received a power-fail warning—but where, in fact, the user or administrator of the system would prefer that the multiple processing system 10 not restart. For example, if the processors 12 ostracized as a result of a Regroup operation include certain critical processors or if the ostracized processors 12 are a big enough set of the resources of the system 10, then the user or administrator may prefer the system 10 to not restart. A critical processor 12 could be, for example, the sole processor 12 handling data I/O for the system 10 or the processor 12 responsible for maintaining the system-wide audit trail for a distributed database.

Certain redundant computing environments are another example of when a minimum number of processors 12 may be required for multiple processing system 10 to operate correctly. In these redundant computing environments, an accurate computed result is defined to be that result which a majority of a minimum number of processors reach. Alternatively, a fault in a processor 12 can be detected by that processor's failure to agree with the other, say, four processors 12 in multiple processing system 10. In essence, a quorum of processors may be necessary to continue operations from the operating state existing before a power-fail warning signal was detected.

As the above examples make apparent, the power-fail warning signal recovery methods do not take into account whether certain resources are available when restarting the multiple processing system 10 after a power-fail warning. This is the problem which this invention addresses: re-starting when a critical set of resources is not available.

Internal to or otherwise associated with each of the processors 12 is a configuration option register 19. Each configuration option register 19 is independent of the configuration option register 19 of the other processors 12. The configuration option register 12 can be variously configured to represent the various critical resources and combinations of resources that can be necessary to continue operation. A number of non-limiting example configuration options are disclosed below, including configurations based on processor count, processor count per section, critical resources, critical resource per section, time and combinations of the preceding.

In the case of a simple processor count-based configuration, the configuration option register 19 contains a single number representing the minimum number of processors required to continue operations. When the number of processors 12 that regroup and face the decision whether to continue together or hibernate together exceeds the minimum number of processors required for continued operations as indicated by the configuration option register 19, then the deciding processors 12 continue operation. Otherwise, the deciding processors 12 hibernate. In order to have the system 10 continue if any processors 12 recover, then the configuration option register 19 can be set to a number less than 2.

Alternatively, each processor can be assigned to a section based on location, attached resources, ownership or other characteristic. The configuration option is then a processor count per section, indicating the minimum number of processors from each section that are necessary for operation to continue. Irrelevant or missing sections can be set to zero. If the minimum per section is uniform across all sections, then the configuration option register 19 can contain a single number. Where the per-section minimum is not uniform across all the sections, the configuration option register 19 can be itself divided into corresponding sections.

A per-section processor count is a solution to the problem of a single section losing power. The configuration option register 19 can have the per-section processor count set to 1 for each section. Thus, if any section loses power, that section will not meet the minimum processor count. All processors 12 will hibernate.

As yet another alternative, the configuration option register 19 contains a list of masks. Each mask represents an allowed configuration. If the configuration of the processors 12 deciding whether to continue matches any of the allowed configurations listed, then the system 10 resumes operations. If the configuration fails to match all of the allowed configurations, then the system 10 hibernates. An n-bit value can represent an allowable configuration, where n is the number of processors 12 in the system 10. Each processor 12 has a dedicated bit. For each bit, a logical 1 in the mask can indicate that the respective processor 12 is necessary for operations to continue. A logical zero for a bit would indicate that its respective processor 12 is not necessary. That processor 12 can be missing.

For example, assume that the "system" processor, the processor having the system console and the system boot disk, is processor 0. Processor 1 has the backups for the console and the system disk. Processors 4 and 5 are the primary and backup processors for maintaining the system-wide audit trail for a distributed database. The following table shows the list of masks of allowable configurations in a system of sixteen processors:

TABLE I

| Processor n | | | | | | |
|---|---|---|---|---|---|---|
| Section 1 | | | Section 2 | | | |
| 0 | 1 | 2–3 | 4 | 5 | 6–7 | 8–15 |
| 1 | 0 | 00 | 1 | 0 | 00 | 00000000 |
| 1 | 0 | 00 | 0 | 1 | 00 | 00000000 |
| 0 | 1 | 00 | 1 | 0 | 00 | 00000000 |
| 0 | 1 | 00 | 0 | 1 | 00 | 00000000 |

As the table of allowable configurations shows, there must be a system processor and an audit trail processor for operations to continue. Either a primary or backup processor will suffice.

The critical resources configuration option disclosed above can require on the order of $m^n$ list entries if for each of n critical resources there are m processors 12 capable of providing that resource. However, by listing each of the m processors for each of n resources, the list of allowable configurations can be significantly smaller. For the example above, only two masks are required to define all valid configurations involving a first section of: 1000 0000 0000 0000 and 0100 0000 0000 0000 (or just 1000 and 0100, each with an indication of the relevant section). Similarly, only two masks are required to define all valid configurations of section 2:0000 0100 0000 0000 and 0000 1000 0000 0000. Processors 12 in a Regroup now ask whether any of the section 1 configuration masks are matched, whether any of the section 2 masks are matched, etc. The number of list entries under this configuration option would be only on the order of m*n.

Combining the above configuration options is possible. For example, it is possible to specify both a minimum number of processors 12 for the multiprocessor system 10 and separate per-section critical resource masks. It is possible to specify a per-section minimum processor count in some sections and a critical resource mask in other sections.

In a preferred embodiment, a multiprocessor system 10 practicing the invention must take the passage of time into account, regardless of which configuration option or combination of configuration options it pursues. It is more costly to keep a system unavailable for a long time, and as time passes, the odds of a missing resource returning are increasingly remote. Thus, a system administrator of the multiple-processor system 10 might want to be very strict at first, causing hibernation for a short period of time if a single resource is missing. Then after 10, 20 or 50 seconds, the system administrator might want the rules for successful operation to relax.

(Of course, that a system administrator may desire to tighten the rules for successful operation as time progresses is also conceivable.)

A time-based configuration option might be a set of rules, each of which has a specified time delay. As each time delay is reached, the corresponding rule replaces the older rule, and the hibernating processors 12 re-evaluate their decision to hibernate.

A time-based configuration option offers excellent flexibility. For example, a forced exit from hibernation at a pre-specified time also becomes possible by eventually setting the minimum processors to be zero and all critical resource masks to logical zero, as appropriate.

An example of a time-based configuration option follows. The example assumes that the system administrator prefers that for the first 10 seconds, the multiprocessor system 10 hibernates unless all processors 12 are available. (Twelve processors 12 compose the system 10.) Then, up until 50 seconds, the system 10 is to hibernate unless at least ten processors 12 are available and at least three processors per section are available. After that, up until 100 seconds, the multiprocessor system 10 is to hibernate unless at least six processors 12 are available, one of processors 0 and 1 are available and one of processors 4 and 5 are available. After 100 seconds, the system 10 is to resume operations unconditionally. The list of time-based configuration options, therefore, could be as follows:

Such a time-based configuration option might be a set of sets of rules, a "meta-set" of sets of rules. Each set of rules in the meta-set would have an associated time period. Should a regroup occur during that associated time period, that set of rules would be the applicable rules for the regrouping processors to follow. When the time period associated with one set of rules passes, another time period becomes the effective time period and the associated rules become the applicable rules should a regroup occur. In a preferred embodiment, the time periods of the sets of rules in a meta-set cover all possible times and do not overlap. Also, the granularity of the time periods of the meta-set are much, much coarser than the time delays for rules based on the passage of time since a regroup has begun.

Should a meta-set time period pass while the processors 12 are in a regroup operation, the processors 12 will preferably apply the newly applicable set of rules to determine whether the system 10 should continue operation.

Table III is an example of a rules meta-set. Table III assumes that the set of rules specified in Table II are adequate should a regroup occur from 07:30 A.M. to 8:00 P.M. Should a regroup occur in the hour from 8:00 P.M. to 9:00 P.M., the multiprocessor system 10 is to hibernate for 100 seconds, unless at least six processors 12 are available,

TABLE II

| Tens of Seconds Since Regroup Began | System-Wide Processor Count | Per-Section Minimum Processor Count for Section 1 | Per-Section Minimum Processor Count for Section 2 | Per-Section Minimum Processor Count for Section 3 |
|---|---|---|---|---|
| 0 | 12 | 4 | 4 | 4 |
| 1 | 10 | 3 | 3 | 3 |
| | | Critical Resource Masks for Section 1 | Critical Resource Masks for Section 2 | Critical Resource Masks for Section 3 |
| 5 | 6 | 0100<br>1000 | 0100<br>1000 | 0000 |
| Tens of Seconds Since Regroup Began | System-Wide Processor Count | Per-Section Minimum Processor Count for Section 1 | Per-Section Minimum Processor Count for Section 2 | Per-Section Minimum Processor Count for Section 3 |
| 10 | 0 | 0000 | 0000 | 0000 |

To permit multiple processors 12 to proceed in a time-synchronized manner through a set of time-based configuration options, each processor 12 maintains a time-of-day timepiece, as described above. The timepiece is in sync with the timepieces of the other processors 12. Preferably, any variance between any two timepieces among processors 12 is guaranteed to be much less than the granularity of time in the time-based rules. In the preferred embodiment, all processors 12 enter regroup within a fraction of a second of each other and time granularity of a few seconds suffices.

In a preferred embodiment, a multiprocessor system 10 practicing the invention takes into account the time of day, the day of the week, the day, week or month of the year, etc. For some time periods, the resources critical to the operation of the system may be different than the resources critical at other time periods. Thus, a system administrator of the multiprocessor system 10 might want to cause hibernation more readily at some time periods while relaxing the rules for successful operation at other time periods.

one of processors 0 and 1 are available and one of processors 4 and 5 are available. As before, after 100 seconds, the system 10 is to resume operations unconditionally. Finally, in the hours between 9:00 P.M. and 7:30 A.M., the system 10 is to resume operations unconditionally. Such unconditional resumption could be preferable where any surviving processor 12 will notify the system administrator (e.g., via pager) of the regrouping operation and the system 10 is not being used heavily. (In the example of Table III, the time periods of the meta-set cover all possible times and do not overlap.)

Figure 4:
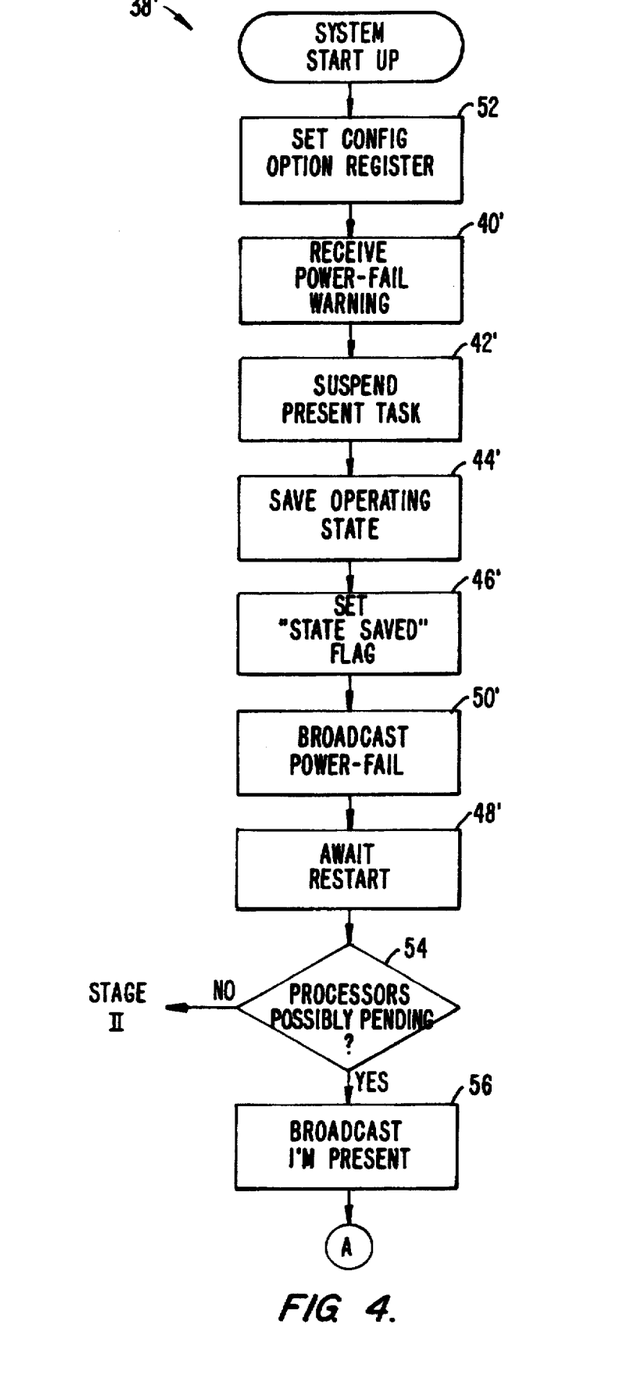
FIG. 4 is a flow diagram illustration of the steps taken in preparation for and in response to a power-fail signal, according to the present invention.
Figure 5:
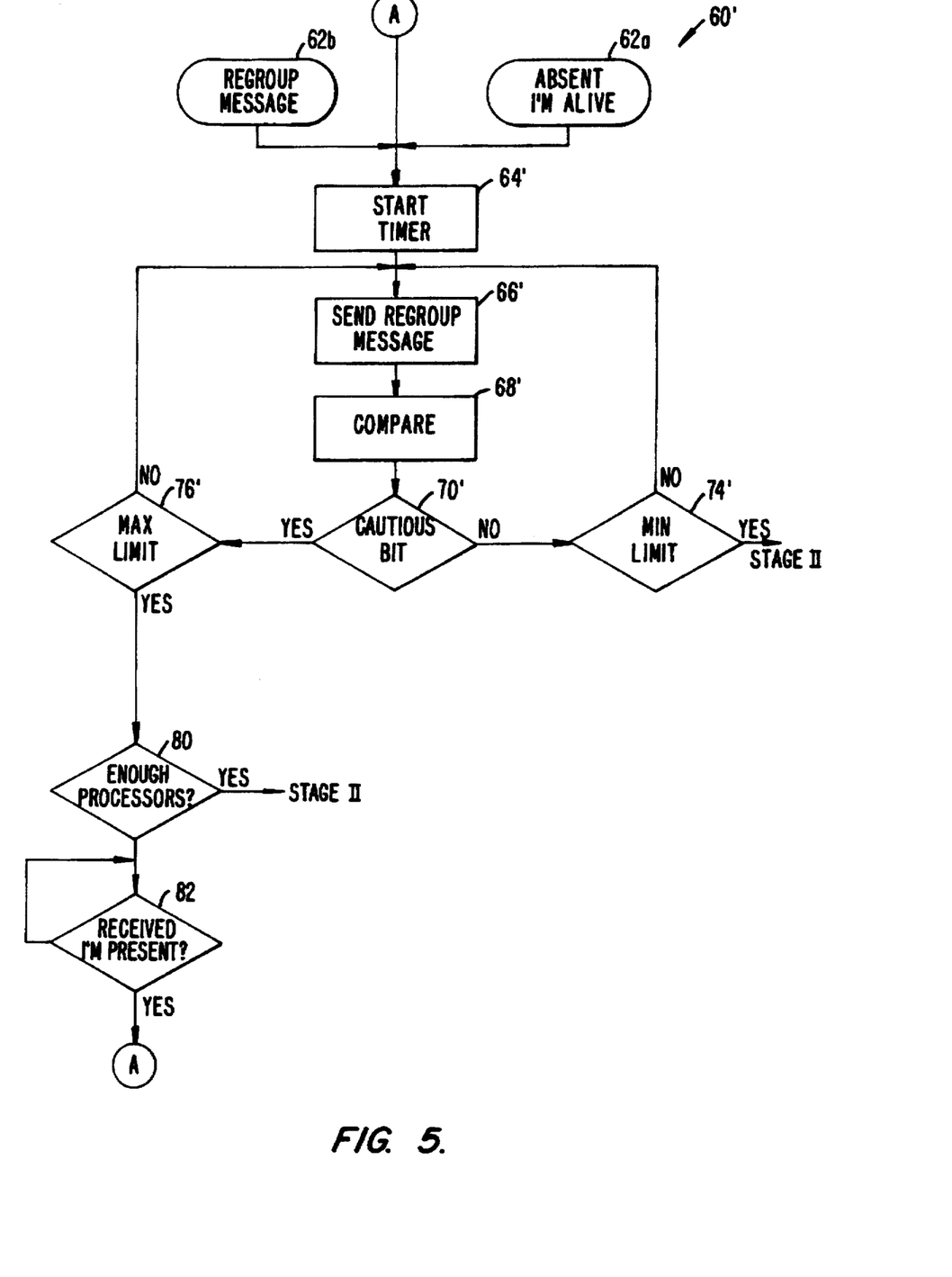
FIG. 5 is a flow diagram that broadly illustrates the regroup operation taken by the processors of FIG. 1 to determine what processors are present in the system, and what are not, according to the present invention.

FIGS. 4 and 5 illustrate the solution to the problem of regrouping without enough critical resources. Referring first to FIG. 4, there is illustrated the pre-hibernation sequence a processor 12 performs in preparation for and on receipt of the power-fail warning signal—modified according to the present invention. The modified pre-hibernation routine, designated by reference numeral 38', now begins with processor 12, at the direction of the system administrator or other user of the system 10 on or after system start up, setting a configuration option register 19 (step 52). (The configuration option register 19 is not shown.) With this configuration option register 19, the user specifies the resources that must be simultaneously available in regrouping in order for Stage I of a Regroup operation to complete. The broad effect of such a specification is to extend regrouping to include a hibernation phase where processors 12 otherwise ready to leave the above-described Stage I will wait until enough other processors 12 become available to compose a system as described by the configuration option register. At that point hibernation ceases and the regrouping continues as above. This process is explained more fully below. The user can specify that only one processor need be available. This is preferably the default. Of course, as it is not known at the time of performing step 52 which processors 12 will subsequently receive a power-fail warning, all processors 12 will perform step 52.

As FIG. 4 shows, the pre-hibernation routine 38' continues to have the processor 12 proceed through the steps of receiving a power-fail warning (step 40'), suspending the present task (step 42'), saving the operating state of the processor 12 (step 44') and, if the state has been successfully saved, setting the "state saved" flag (step 46'). Processor 12 will also, time permitting, broadcast to all other processors 12 that it has received a power-fail warning signal and is in a pre-hibernation sequence (step 50'). The modified pre-hibernation sequence 38' of FIG. 4 concludes in the same manner as the pre-hibernation sequences 38 of FIG. 2 with step 48' in which the processor 12 goes into hibernation to await restart and re-initialization.

Turning now to FIG. 5, a flow diagram illustrates Stage I' of the Regroup operation, indicated generally with the reference numeral 60', as modified according to the teaching of the instant invention. As explained above, Stage I' is executed by a processor 12, asynchronously with respect to the other processors 12. Stage I' begins when a processor 12 notes either that a companion processor has failed to transmit its periodic I'm Alive message (Step 62a') or the processor 12 receives a Regroup message from another of the processors 12 (step 62b'). Next, the processors 12 participating in the Regroup operation will each start an internal timer (not shown) that will initially (as further explained below) determine the time for Stage I' operation step 64'. At step 66' each of the processors 12 will send a Regroup message, containing the processor's view of the system 10, including the cautious bit. If any power-fail broadcast was received by the processor 12 prior to entering the Regroup operation 60', or prior to step 66', the cautious bit will be set. Having received this Regroup message and/or having noted the failure of a processor 12 to send an I'm Alive message, each processor 12 will enter the Regroup operation. If any of the other processors 12, upon entering the Regroup operation at step 62a' notes that a broadcast of a power-fail message was received since the last Regroup operation, the Regroup message of that processor will have its cautious bit set.

At step 68', the Regroup message(s) are examined. The view of the system maintained in memory 18 will be updated accordingly. At step 70', the cautious bit is checked. If the cautious bit is not set and the value of the internal timer equals or exceeds a minimum time value (step 74'), Stage I' will be exited to begin Stage II. If, on the other hand, the cautious bit is set and the processor's internal timer exceeds that of the maximum limit value (step 76'), then the processor 12 checks the configuration option register 19 (not shown). If the resources currently available are less than as specified in the configuration option register 19, then the processor 12 goes into hibernation to wait for a processor 12 to complete its power-fail warning recovery and add its resources to those previously available (step 82). In order to determine when another processor becomes available, while in hibernation, the processor 12 leaves enabled its interprocessor communications receiver 17 to detect an I'm Present message from a previously unavailable processor 12. The processor 12 also receives I'm Alive messages from the other processors 12 it knows to be participating in the regroup. A failure to receive such an expected I'm Alive message results in that processor 12's initiating a new regroup through step 62a.

Each processor 12 that awakens after receiving a power-fail warning checks the configuration option register 19 (step 54 of FIG. 4). If the configuration option register 19 indicates that some other processors 12 may have gone into hibernation pending the recovery of this processor 12, this processor 12 broadcasts an I'm Present message (step 56 of FIG. 4) and joins the regroup resulting from that broadcast. This I'm Present message may be the same as the I'm Alive message. When the resources of all of the processors deciding whether to enter hibernation satisfy the requirements specified in the configuration option register 19, then all the processors forgo hibernation and enter Stage II.

Step 54 is optional in that an awakening processor 12 can proceed from step 48' directly to step 56, with the presence of the awakening processor handled by a fully operating (non-hibernating) system 10 as described above.

The newly awakened processors are informed of the processors that were in hibernation by the Regroup messages broadcast during the Regroup operation. As described above, Regroup messages contain the broadcaster's view of the system, including its own identity and the identity of other processors 12 believed to be in the system. With this information, each newly awakened processor 12 can be placed into the same state of information as any processor 12 that had been operating continuously.

Of course, the critical resource upon which continued operation of multiple processing system 10 may hinge can be processors, free disk storage, cache, access modems, or any other computer system resource.

Finally, the configuration option in the configuration option register 19 may be a formula. The formula can specify combinations of resources, e.g., n processors with m megabytes of cache among them.

Stage II was not modified to accommodate the present invention. Even the check in Stage I for the cautious bit was present before modification of the pre-hibernation routine 38' (FIG. 3), but for other reasons not relevant to the present invention. The principal difference between Stage I and Stage II is the fact that Stage I continues until the timer set at step 64 times out; Stage II will not end until all participating processors 12 agree as to the make-up of the system.

Table III

| Time of Day | Tens of Seconds Since Regroup Began | System-Wide Processor Count | Per-Section Minimum Processor Count for Section 1 | Per-Section Minimum Processor Count for Section 2 | Per-Section Minimum Processor Count for Section 3 |
|---|---|---|---|---|---|
| 0730 | 0 | 12 | 4 | 4 | 4 |
|  | 1 | 10 | 3 | 3 | 3 |
|  |  |  | Critical Resource Masks for Section 1 | Critical Resource Masks for Section 2 | Critical Resource Masks for Section 3 |
|  | 5 | 6 | 0100 | 0100 | 0000 |
|  |  |  | 1000 | 1000 |  |
|  | 10 | 0 | 0000 | 0000 | 0000 |
| 2000 | 0 | 6 | 0100 | 0100 | 0000 |
|  |  |  | 1000 | 1000 |  |
|  | 10 | 0 | 0000 | 0000 | 0000 |
| 2100 | 0 | 0 | 0000 | 0000 | 0000 |

What is claimed is:

1. In a multiprocessing system having a plurality of processors, each of said plurality of processors having a respective memory, a method for reconfiguring said system when a predetermined critical set of resources is necessary for operation of said multiprocessing system, said method comprising:

communicatively coupling said plurality of processors by means of a network; and configuring said plurality of processors as co-peers for purposes of reconfiguring;

configuring a register to represent said predetermined critical set of resources;

after said coupling and configuring, recognizing failure of a first of said plurality of processors to receive a message periodically broadcast by a second of said plurality of processors by means of said network, said message indicating the continued operation of said second processor;

in response to said recognition of failure, determining a set of processors, said set comprising processors of said plurality of processors that indicate their continued operation; and reconfiguring said system, continuing operation of said system and ostracizing from said multiprocessor system any processor of said plurality of processors not a member of said set only if said set of processors comprise said predetermined critical set of resources.

2. The method of claim 1 further comprising the steps of before said step of recognizing failure, generating on and receiving on said second processor advance warning of a loss of power on said second processor;

in response to said generating and receiving, suspending tasks being performed on said second processor; and then saving a portion of the state of said second processor such that if power is subsequently lost as indicated by said advance warning and restored within a predetermined period of time, said second processor can resume said tasks; and setting a variable to indicate said portion of the state of said second processor has been saved.

3. The method of claim 2 further comprising the steps of receiving on said second processor an indication of normal power;

checking said variable to determine whether said portion of the state of said second processor has been saved; and restoring said portion of the state of said second processor if said variable indicates said portion of the state of said second processor has been saved.

4. The method of claim 1, further comprising the steps of before said step of failure, generating on and receiving on said second processor advance warning of a loss of power on said second processor;

then broadcasting an advance warning receipt message indicating said second processor's receipt of said advance warning; and then receiving on one of said plurality of processors said advance warning receipt message; and said step of determining comprises taking said second processor's receipt of said advance warning into account, thereby delaying the final determination of said set.

5. The method of claim 4 wherein said step of receiving said advance warning receipt message comprises setting a variable indicating receipt of said advance warning receipt message; and broadcasting a message comprising said variable; and said step of determining further comprises checking said message to determine whether said variable has been set; and including a predetermined delay in said determining of said set if said variable has been set.

6. The method of claim 4 wherein said step of receiving said advance warning receipt message comprises setting a variable indicating receipt of said advance warning receipt message; and said step of determining further comprises checking whether said variable has been set; and including a predetermined delay in said determining of said set if said variable has been set.

7. The method of claim 1 wherein said step of configuring comprises configuring said register to represent said predetermined critical set of resources as based on processor count.

8. The method of claim 1 wherein said step of configuring comprises configuring said register to represent said predetermined critical set of resources as based on processor count per section.

9. The method of claim 1 wherein said step of configuring comprises configuring said register to represent said predetermined critical set of resources as based on critical resources.

10. The method of claim 1 wherein said step of configuring comprises configuring said register to represent said predetermined critical set of resources as based on critical resources per section.

11. The method of claim 1 wherein said step of configuring comprises configuring said register to represent said predetermined critical set of resources as based on time.

12. The method of claim 1 wherein said step of configuring comprises configuring said register to represent said predetermined critical set of resources as based on a meta-set of sets of rules.

13. The method of claim 1 wherein said step of configuring comprises configuring said register to represent said predetermined critical set of resources as based on a formula.

14. The method of claim 1 wherein said step of configuring comprises configuring said register to represent said predetermined critical set of resources as based on a combination at least two of processor count, processor count per section, critical resources, critical resources per section, time, a meta-set of sets of rules and a formula.

15. The method of claim 1 wherein said step of reconfiguring comprises reconfiguring said system, continuing operation of said system and automatically notifying a human being only if said set of processors comprise said predetermined critical set of resources.

16. The method of claim 1 further comprising the step of continuing from said step of determining if said set of processors do not comprise said predetermined critical set of resources.

17. An multiprocessor system comprising:

a network;

a plurality of processors communicatively coupled by means of said network and configured as co-peers for purposes of reconfiguring, each of said plurality of processors having a respective memory wherein is located a computer program for causing said respective processor to reconfigure said system when a predetermined critical set of resources is necessary for operation of said multiprocessing system by configuring a register to represent said predetermined critical set of resources;

after said configuring, recognizing failure of a first of said plurality of processors to receive a message periodically broadcast by a second of said plurality of processors by means of said network, said message indicating the continued operation of said second processor;

in response to said recognition of failure, determining a set of processors, said set comprising processors of said plurality of processors that indicate their continued operation; and reconfiguring said system and continuing operation of said system and ostracizing from said multiprocessor system any processor of said plurality of processors not a member of said set only if said set of processors comprise said predetermined critical set of resources.

18. An article of manufacture comprising a medium for data storage wherein is located a computer program for causing a processor in a multiprocessor system to computer system to reconfigure said system when a predetermined critical set of resources is necessary for operation of said multiprocessing system by communicatively coupling said plurality of processors by means of a network; and configuring said plurality of processors as co-peers;

configuring a register to represent said predetermined critical set of resources;

after said coupling and configuring, recognizing failure of a first of said plurality of processors to receive a message periodically broadcast by a second of said plurality of processors by means of said network, said message indicating the continued operation of said second processor;

in response to said recognition of failure, determining a set of processors, said set comprising processors of said plurality of processors that indicate their continued operation; and reconfiguring said system and continuing operation of said system and ostracizing from said multiprocessor system any processor of said plurality of processors not a member of said set only if said set of processors comprise said predetermined critical set of resources.

* * * * *